US 6,678,362 B2

(12) United States Patent
Hong et al.

(10) Patent No.: US 6,678,362 B2
(45) Date of Patent: Jan. 13, 2004

(54) SYSTEM AND METHOD FOR EFFECTIVELY MANAGING TELEPHONE FUNCTIONALITY BY UTILIZING A SETTOP BOX

(75) Inventors: Yan Hong, San Jose, CA (US); Takahiro Fujimori, Tokyo (JP)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 10/062,968

(22) Filed: Jan. 31, 2002

(65) Prior Publication Data

US 2003/0142802 A1 Jul. 31, 2003

(51) Int. Cl.[7] .............................................. H04M 11/00
(52) U.S. Cl. ............................ 379/102.03; 379/142.16; 725/131
(58) Field of Search ....................... 379/102.01, 102.02, 379/102.03, 110.01, 93.23, 142.16; 455/420, 462, 566; 725/106, 114, 131

(56) References Cited

U.S. PATENT DOCUMENTS 5,671,267 A * 9/1997 August et al. .............. 455/420
6,243,129 B1 * 6/2001 Deierling et al. .......... 348/14.08

FOREIGN PATENT DOCUMENTS

JP          408223257 A  *  8/1996  ............ H04M/1/00

* cited by examiner

Primary Examiner—Melur Ramakrishnaiah
(74) Attorney, Agent, or Firm—Gregory J. Koerner; Simon & Koerner LLP (57) ABSTRACT

A system and method for effectively managing telephone functionality by utilizing a settop box may preferably include a television coupled to the settop box for displaying television programming from a television programming source, and a telephone coupled to the settop box for receiving telephone calls from a telephone network. The settop box may include a TV mute manager for controlling a television mute mode that may be activated to mute audio programming on the television when receiving incoming telephone calls. The settop box may further include a caller ID manager that controls a caller ID mode that may be activated to display caller identifications on the television when receiving incoming telephone calls. The settop box may also include a phone mute manager that controls a telephone mute mode that may be activated to mute telephone ringing when receiving incoming telephone calls.

41 Claims, 6 Drawing Sheets

SYSTEM AND METHOD FOR EFFECTIVELY MANAGING TELEPHONE FUNCTIONALITY BY UTILIZING A SETTOP BOX

BACKGROUND SECTION

1. Field of the Invention

This invention relates generally to techniques for supporting electronic communications, and relates more particularly to a system and method for effectively managing telephone functionality by utilizing a settop box.

2. Description of the Background Art

Implementing effective methods for managing electronic communications is a significant consideration for designers and manufacturers of contemporary electronic devices. However, effectively managing electronic communications between various electronic devices may create substantial challenges for system designers. For example, enhanced demands for increased device functionality and performance may require more system processing power and require additional hardware resources. An increase in processing or hardware requirements may also result in a corresponding detrimental economic impact due to increased production costs and operational inefficiencies.

Furthermore, enhanced device capability to perform various advanced operations may provide additional benefits to a system user, but may also place increased demands on the control and management of various device components. For example, an enhanced electronic device that effectively supports telephonic communications may benefit from an efficient implementation because of the large amount and complexity of the digital data involved.

Due to growing demands on system resources and substantially increasing data magnitudes, it is apparent that developing new techniques for managing electronic communications is a matter of concern for related electronic technologies. Therefore, for all the foregoing reasons, developing effective systems for managing electronic communications remains a significant consideration for designers, manufacturers, and users of contemporary electronic devices.

SUMMARY

In accordance with the present invention, a system and method for effectively managing telephone functionality by utilizing a settop box are disclosed. In accordance with the present invention, the settop box is preferably coupled to a television and a telephone, and may preferably support a TV mute mode, a caller ID mode, and a phone mute mode which may be activated either individually or in various appropriate combinations.

In one embodiment of the TV mute mode, a system user or other appropriate entity may preferably activate the television mute mode in the settop box (STB) by utilizing any effective means. Then, the STB may preferably monitor a communication line or other suitable input path for an incoming telephone call from an external entity such as a telephone network. If an incoming telephone call is received by the STB, then a phone manager may preferably detect the incoming telephone call.

Next, the phone manager may preferably notify a TV mute manager that an incoming telephone call has been received by the STB. The TV mute manager may then preferably mute audio programming from the television by utilizing any effective technique. Finally, the STB may preferably enable the telephone to ring in order to indicate to the system user that an incoming telephone call has been received. In certain embodiments, the foregoing television mute mode may operate concurrently with the caller ID mode discussed below. In accordance with the present invention, the TV mute mode may thus provide an improved technique for ensuring that important telephone calls are not missed due to relatively louder audio programming from the television.

In one embodiment of the caller ID mode, a system user or other appropriate entity may preferably activate the caller ID mode in the STB by utilizing any effective means. Then, the STB may preferably monitor a communication line or other suitable input path for an incoming telephone call from an external entity. If an incoming telephone call is received by the STB, then a phone manager may preferably detect the incoming telephone call, and may preferably notify a caller ID manager that an incoming telephone call has been received by the STB.

The caller ID manager may next preferably display a caller ID or other related icon on a portion of the television screen by utilizing any effective technique. The STB may then preferably enable the telephone to ring in order to indicate to the system user that an incoming telephone call has been received. Finally, the caller ID manager may preferably display the caller ID on a STB display of the STB.

In certain embodiments, the system user may use the STB as a hands-free telephone by utilizing a microphone coupled to the STB, speakers from the television, and the phone manager. In accordance with the present invention, the caller ID process may thus provide an improved technique for ensuring that sources of incoming telephone calls may be easily screened by a system user who is simultaneously viewing television programming.

In one embodiment of a combined-mode process that utilizes the phone mute mode in conjunction with the caller ID mode, a system user or other appropriate entity may preferably activate the caller ID mode and the phone mute mode of the settop box by utilizing any effective means. Then, the STB may preferably monitor a communication line or other suitable input path for an incoming telephone call from an external entity. If an incoming telephone call is received by the STB, then a phone manager may preferably detect the incoming telephone call.

Next, the phone manager may preferably notify a caller ID manager and a phone mute manager that an incoming telephone call has been received by the STB. The caller ID manager may then preferably display a caller ID or other icon on a portion of the television screen by utilizing any effective technique. Next, the phone mute manager may preferably mute the ringing feature of the telephone by utilizing any effective techniques. Finally, the caller ID manager may preferably display the caller ID on a STB display of the STB.

In certain embodiments, the system user may utilize the STB as an answering machine device to record and later playback telephone calls which the system user decides not to answer immediately. In accordance with the present invention, the foregoing combined-mode process may thus provide an improved technique for ensuring that telephone sounds do not interrupt television programming that is currently being viewed by a system user. The foregoing combined-mode process may preferably also ensure that sources of incoming telephone calls may be easily screened by a system user who is simultaneously viewing the television programming. The present invention thus provides an improved system and method for effectively managing telephone functionality by utilizing a settop box.

DETAILED DESCRIPTION

The present invention relates to an improvement in electronic communication techniques. The following description is presented to enable one of ordinary skill in the art to make and use the invention, and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention comprises a system and method for effectively managing telephone functionality by utilizing a settop box, and may preferably include a television coupled to the settop box for displaying television programming from a television programming source, and a telephone coupled to the settop box for receiving telephone calls from a telephone network.

The settop box may include a TV mute manager for controlling a television mute mode that may be activated to mute audio programming on the television when receiving incoming telephone calls. The settop box may further include a caller ID manager that controls a caller ID mode that may be activated to display caller identifications on the television when receiving incoming telephone calls. The settop box may also include a phone mute manager that controls a telephone mute mode that may be activated to mute telephone ringing when receiving incoming telephone calls.

Figure 1:
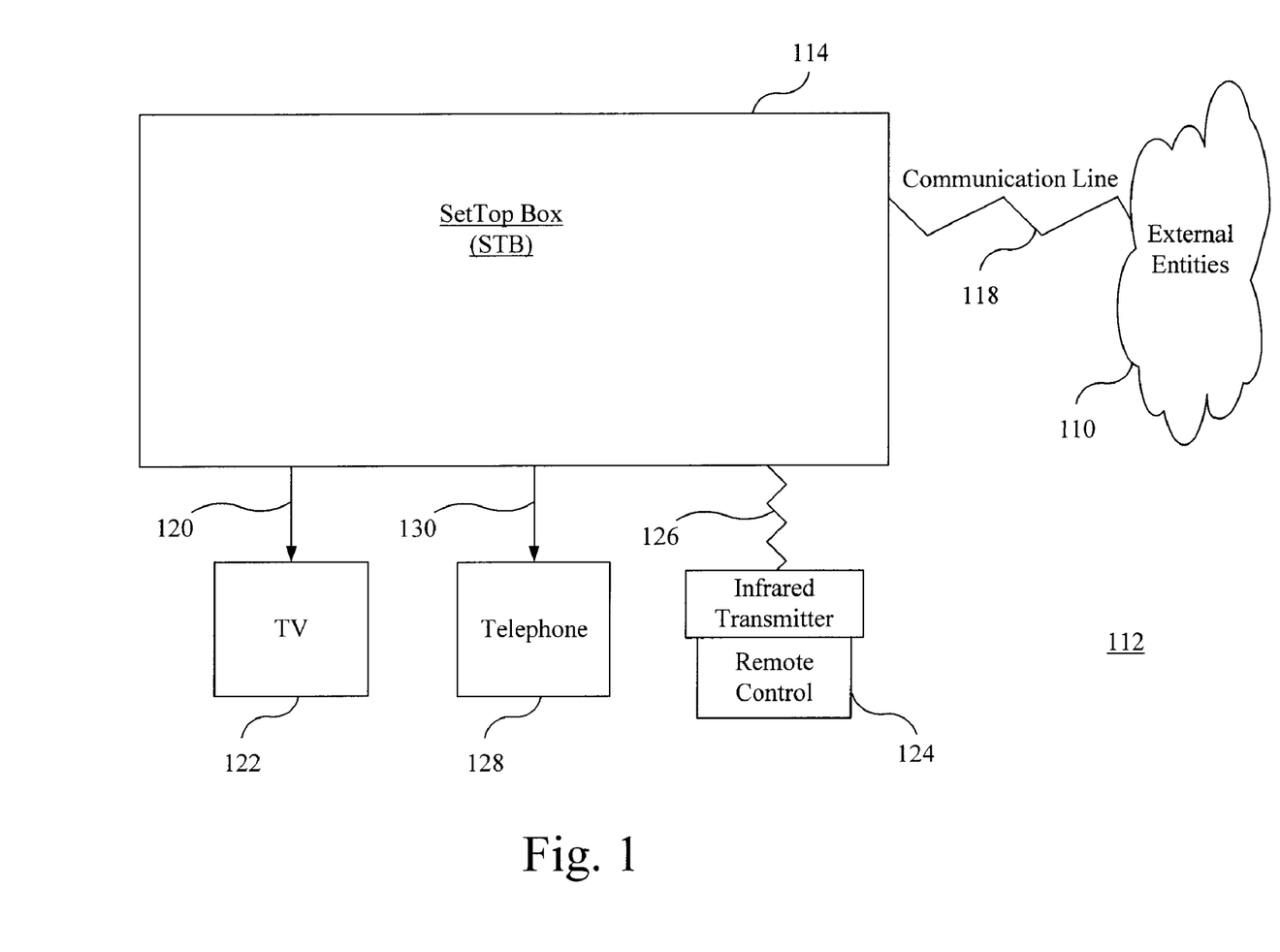
FIG. 1 is a block diagram of an electronic system, in accordance with one embodiment of the present invention.

Referring now to FIG. 1, a block diagram of an electronic system 112 is shown, in accordance with one embodiment of the present invention. In the FIG. 1 embodiment, electronic system 112 may preferably include, but is not limited to, a settop box (STB) 114, a television (TV) 122, a telephone 128, a remote control 124, and various external entities 110. In alternate embodiments, electronic system 112 may readily be implemented using various components and configurations in addition to, or instead of, those discussed in conjunction with the FIG. 1 embodiment. For example, a computer device (not shown) or other electronic devices may readily be coupled to STB 114 to thereby communicate with external entities 110 or any other device in electronic system 112.

In the FIG. 1 embodiment, settop box (STB) 114 may preferably be implemented as any electronic device that is configured to support and manage various functionalities for utilizing TV 122, telephone 128, or other devices (not shown) in electronic system 112. In the FIG. 1 embodiment, STB 114 may preferably communicate with various external entities 110 via communications line 118, or by utilizing any other desired communication technologies or methods. In certain embodiments, communications line may be implemented as a coaxial cable. In the FIG. 1 embodiment, remote control 124 may preferably be implemented as wireless device that includes an infrared transmitter unit by which a system user may input various types of information via transmission path 126 to control the operation of STB 114. The operation and utilization of STB 114 is further discussed below in conjunction with FIGS. 4–6.

In the FIG. 1 embodiment, external entities 110 may preferably include any appropriate systems, devices, or other electronic entities. For example, in the FIG. 1 embodiment, external entities 110 may preferably include a television programming source for providing various types of television programming to TV 122 via STB 114. In the FIG. 1 embodiment, external entities 110 may preferably also include a telephone network for supporting telephonic communications between telephone 128 and other communication partners coupled to the foregoing telephone network. In certain embodiments, external entities 110 may additionally include a distributed computer network (not shown), such as the Internet.

In the FIG. 1 embodiment, TV 122 and telephone 128 may be implemented in any effective and appropriate manner. In certain embodiments, telephone 128 may preferably be implemented as an internet protocol (IP) telephone, and may also utilize a media gateway control protocol (MGCP). In the FIG. 1 embodiment, telephone 128, television 122, STB 114, and the telephone network from external entities 110 may preferably be implemented to support a caller ID functionality in which an identifier (such as a caller name and/or a caller telephone number) corresponding to a particular calling party may be multiplexed into incoming call data so that a receiving party may detect and display the identifier to thereby determine the identity of the calling party. The utilization of electronic system 112 is further discussed below in conjunction with FIGS. 4–6.

Figure 2:
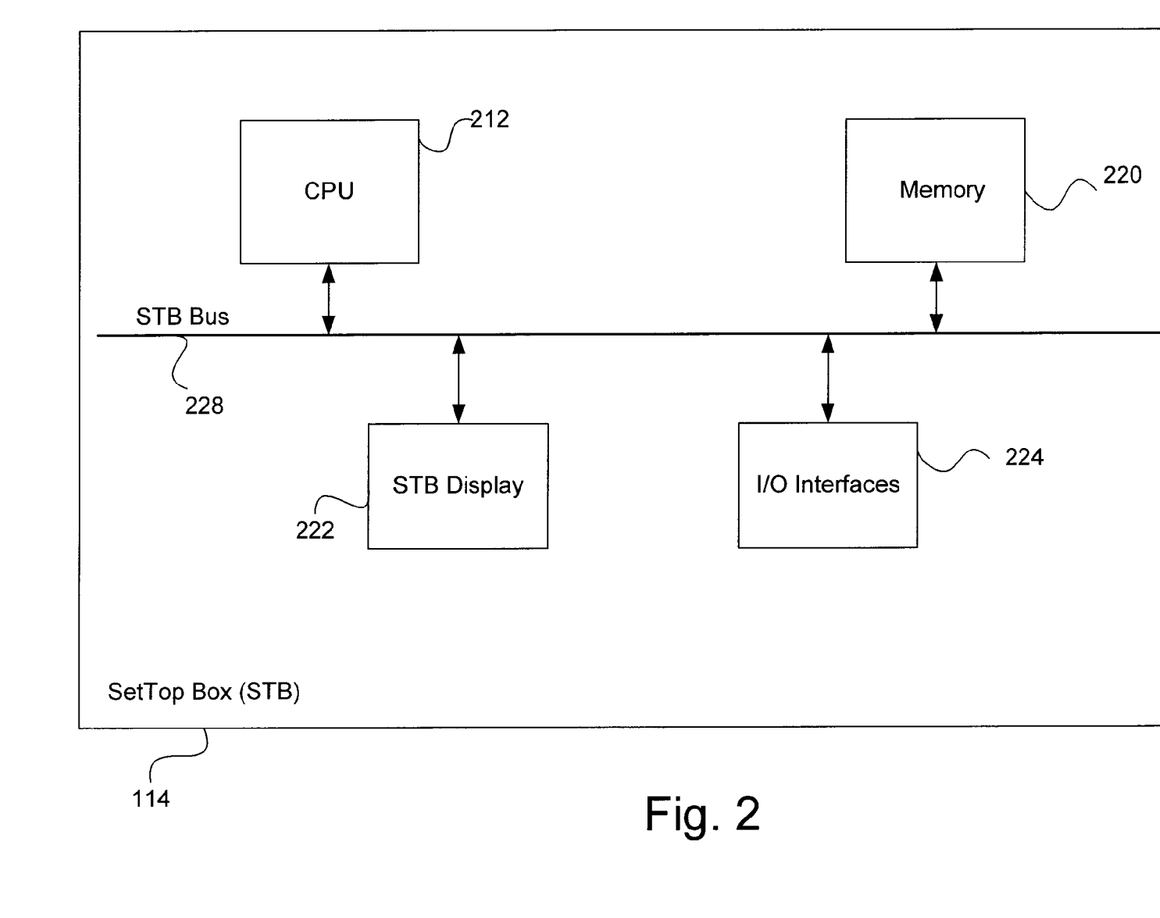
FIG. 2 is a block diagram for one embodiment of the settop box of FIG. 1, in accordance with the present invention.

Referring now to FIG. 2, a block diagram for one embodiment of the FIG. 1 settop box (STB) 114 is shown, in accordance with the present invention. In the FIG. 2 embodiment, STB 114 may preferably include, but is not limited to, a central processing unit (CPU) 212, a memory 220, a STB display 222, and input/output interfaces (I/O interfaces) 224. Selected ones of the foregoing components of STB 114 may preferably be coupled to, and communicate through, an STB bus 228. In alternate embodiments, STB 114 may readily be implemented using various components and configurations in addition to, or instead of, those discussed in conjunction with the FIG. 2 embodiment. In addition, STB 114 may alternately be implemented as any other desired type of electronic device or entity.

In the FIG. 2 embodiment, CPU 212 may be implemented to include any appropriate and compatible microprocessor device that preferably executes software instructions to thereby control and manage the operation of STB 114. In the FIG. 2 embodiment, memory 220 may be implemented to include any combination of desired storage devices, including, but not limited to, read-only memory (ROM), random-access memory (RAM), and various types of non-volatile memory, such as floppy disks or hard disks. The contents and functionality of memory 220 are further discussed below in conjunction with FIG. 3.

In the FIG. 2 embodiment, STB display 222 may preferably be implemented as part of STB 114 by utilizing any appropriate display technology. In the FIG. 2 embodiment, I/O interfaces 224 may preferably include one or more input and/or output interfaces to receive and/or transmit any required types of information for STB 114. For example, in the FIG. 2 embodiment, STB 114 may utilize I/O interfaces 224 to communicate with various external entities 110 via communication line 118 (FIG. 1).

Furthermore, STB 114 may utilize I/O interfaces 224 to communicate with TV 122 via path 122 (FIG. 1), and to communicate with telephone 128 via path 130 (FIG. 1). In addition, a system user may utilize I/O interfaces 224 to communicate with STB 114 by utilizing any appropriate and effective techniques. For example, a system user may utilize remote control 124 to communicate with STB 114 through I/O interfaces 224.

Figure 3:
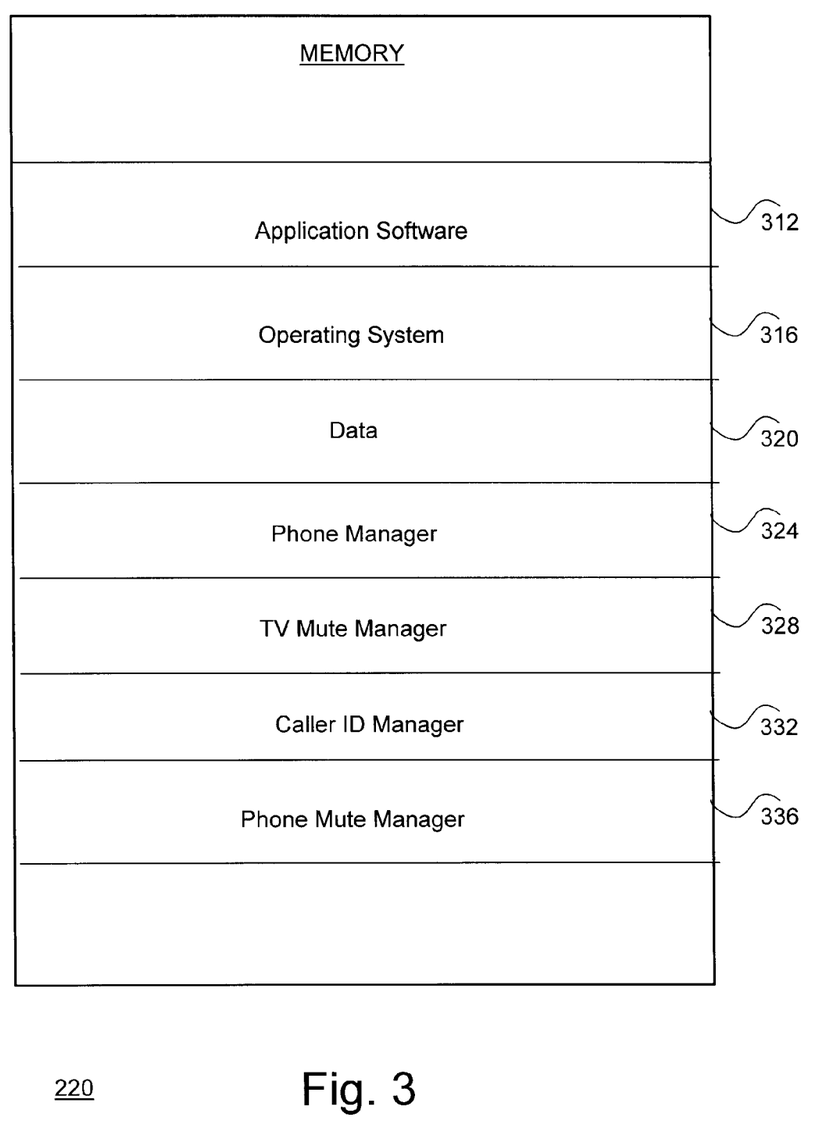
FIG. 3 is a block diagram for one embodiment of the memory of FIG. 2, in accordance with the present invention.

Referring now to FIG. 3, a block diagram for one embodiment of the FIG. 2 memory 220 is shown, in accordance with the present invention. In the FIG. 3 embodiment, memory 220 preferably includes, but is not limited to, application software 312, an operating system 316, one or more types of data 320, a phone manager 324, a TV mute manager 328, a caller ID manager 332, and a phone mute manager 336. In alternate embodiments, memory 220 may readily include various other components in addition to, or instead of, those components discussed in conjunction with the FIG. 3 embodiment.

In the FIG. 3 embodiment, application software 312 may include program instructions that are preferably executed by CPU 212 (FIG. 2) to perform various functions and operations for STB 114. The particular nature and functionality of application software 312 preferably varies depending upon factors such as the specific type and particular functionality of the corresponding STB 114.

In the FIG. 3 embodiment, operating system 316 preferably controls and coordinates low-level functionality of STB 114. In the FIG. 3 embodiment, data 320 may include any appropriate information or data for use by STB 114. For example, data 320 may include video and audio information for TV 122, or may include audio and caller ID information corresponding to a telephone call for telephone 122 (FIG. 1). In the FIG. 3 embodiment, phone manager 324 may preferably coordinate and manage various functions for operating telephone 128.

In accordance with the present invention, STB 114 may preferably utilize TV mute manager 328, caller ID manager 332, and phone mute manager 336 to advantageously support various operational modes to thereby optimize functionality for STB 114 in conjunction with telephone 128 and TV 122. In alternate embodiments, TV mute manager 328, caller ID manager 332, and phone mute manager 336 may readily be implemented in various types of electronic devices other than STB 114. The implementation and utilization of TV mute manager 328, caller ID manager 332, and phone mute manager 336 are further discussed below in conjunction with FIGS. 4 through 6.

In the FIG. 3 embodiment, the present invention is disclosed and discussed as being implemented primarily as software. However, in alternate embodiments, some or all of the functions of the present invention may be performed by appropriate electronic hardware circuits that are configured for performing various functions that are equivalent to those functions of the software modules discussed herein.

Figure 4:
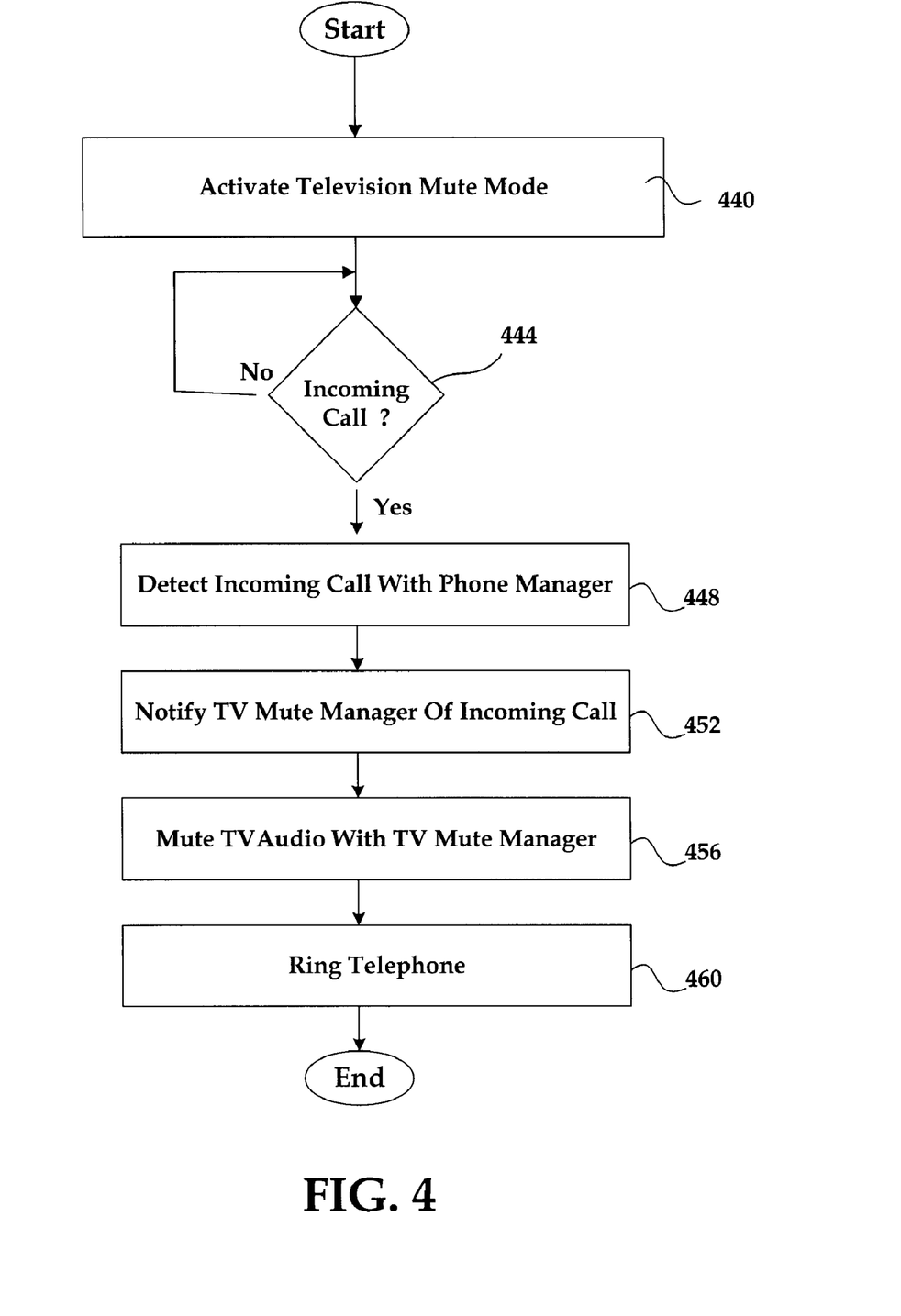
FIG. 4 is a flowchart of method steps for effectively implementing a television mute mode, in accordance with one embodiment of the present invention.

Referring now to FIG. 4, a flowchart of method steps for effectively implementing a television mute mode is shown, in accordance with one embodiment of the present invention. The FIG. 4 example is presented for purposes of illustration, and in alternate embodiments, the present invention may readily utilize various steps and sequences other than those discussed in conjunction with the FIG. 4 embodiment.

In the FIG. 4 embodiment, in step 440, a system user or other appropriate entity may preferably activate a television mute mode in settop box (STB) 114 (FIG. 1) by utilizing any effective means. For example, the system user may utilize a remote control device 124 to activate the foregoing television mute mode. Then, in step 444, STB 114 may preferably monitor a communication line 118 or other suitable input path for an incoming telephone call from an external entity 110.

In step 448, if an incoming telephone call is received by STB 114, then a phone manager 324 may preferably detect the incoming telephone call. Next, in step 452, phone manager 324 may preferably notify a TV mute manager 328 that an incoming telephone call has been received by STB 114. In step 456, TV mute manager 328 may preferably mute audio reproduction capabilities of TV 122 by utilizing any effective technique. For example, TV mute manager 328 may send a TV mute signal to TV 122 whenever the TV mute mode has been activated, and an incoming phone call has been detected.

Finally, in step 460, STB 114 may preferably enable telephone 128 to ring in order to indicate to the system user that an incoming telephone call has been received. The FIG. 4 process may then preferably terminate. In certain embodiments, the foregoing television mute mode of FIG. 4 may operate concurrently with the caller ID mode discussed below in conjunction with FIG. 5. In accordance with the present invention, the FIG. 4 process thus provides an improved technique for ensuring that important telephone calls are not missed due to relatively louder audio programming from television 122.

Figure 5:
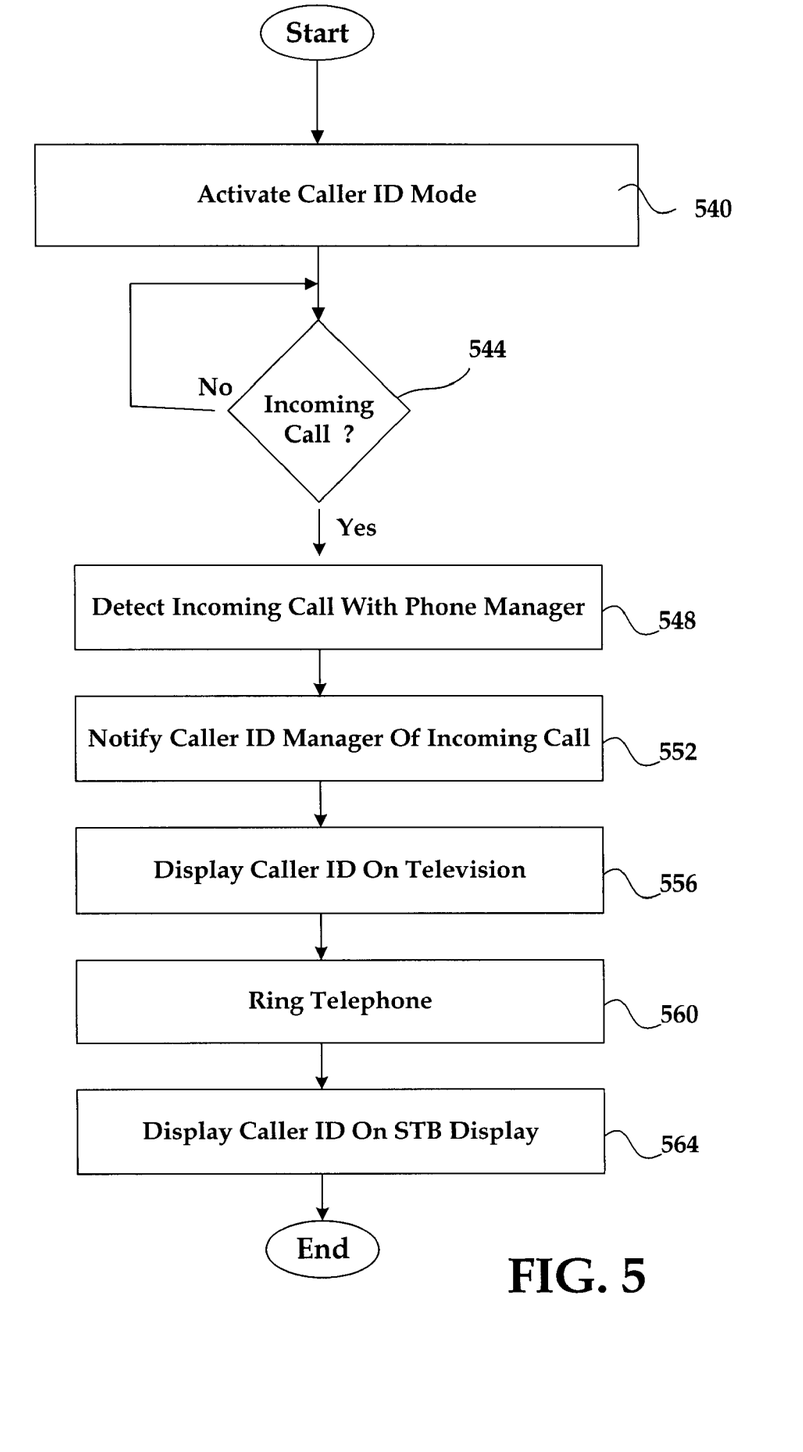
FIG. 5 is a flowchart of method steps for effectively implementing a caller ID mode, in accordance with one embodiment of the present invention.

Referring now to FIG. 5, a flowchart of method steps for effectively implementing a caller ID mode is shown, in accordance with one embodiment of the present invention. The FIG. 5 example is presented for purposes of illustration, and in alternate embodiments, the present invention may readily utilize various steps and sequences other than those discussed in conjunction with the FIG. 5 embodiment.

In the FIG. 5 embodiment, in step 540, a system user or other appropriate entity may preferably activate a caller ID mode in settop box (STB) 114 (FIG. 1) by utilizing any effective means. For example, the system user may utilize a remote control device 124 to activate the foregoing caller ID mode. Then, in step 544, STB 114 may preferably monitor a communication line 118 or other suitable input path for an incoming telephone call from an external entity 110.

In step 548, if an incoming telephone call is received by STB 114, then a phone manager 324 may preferably detect the incoming telephone call. Next, in step 552, phone manager 324 may preferably notify a caller ID manager 332 that an incoming telephone call has been received by STB 114. In step 556, caller ID manager 332 may preferably display a caller ID or other incoming call icon on a portion of the screen of TV 122 by utilizing any effective technique. For example, caller ID manager 332 may decode caller ID information from the incoming telephone call and send a corresponding caller ID signal to TV 122 whenever the caller ID mode has been activated, and an incoming phone call has been detected.

Then, in step 560, STB 114 may preferably enable telephone 128 to ring in order to indicate to the system user that an incoming telephone call has been received. Finally, in step 564, caller ID manager 332 may preferably display the caller ID on STB display 222 of STB 114. In certain embodiments, the system user may use STB 114 as a hands-free telephone by utilizing a microphone coupled to STB 114, speakers from television 122, and phone manager 324. The FIG. 5 process may then preferably terminate. In accordance with the present invention, the FIG. 5 process thus provides an improved technique for ensuring that sources of incoming telephone calls may be easily screened by a system user who is simultaneously viewing television programming.

Figure 6:
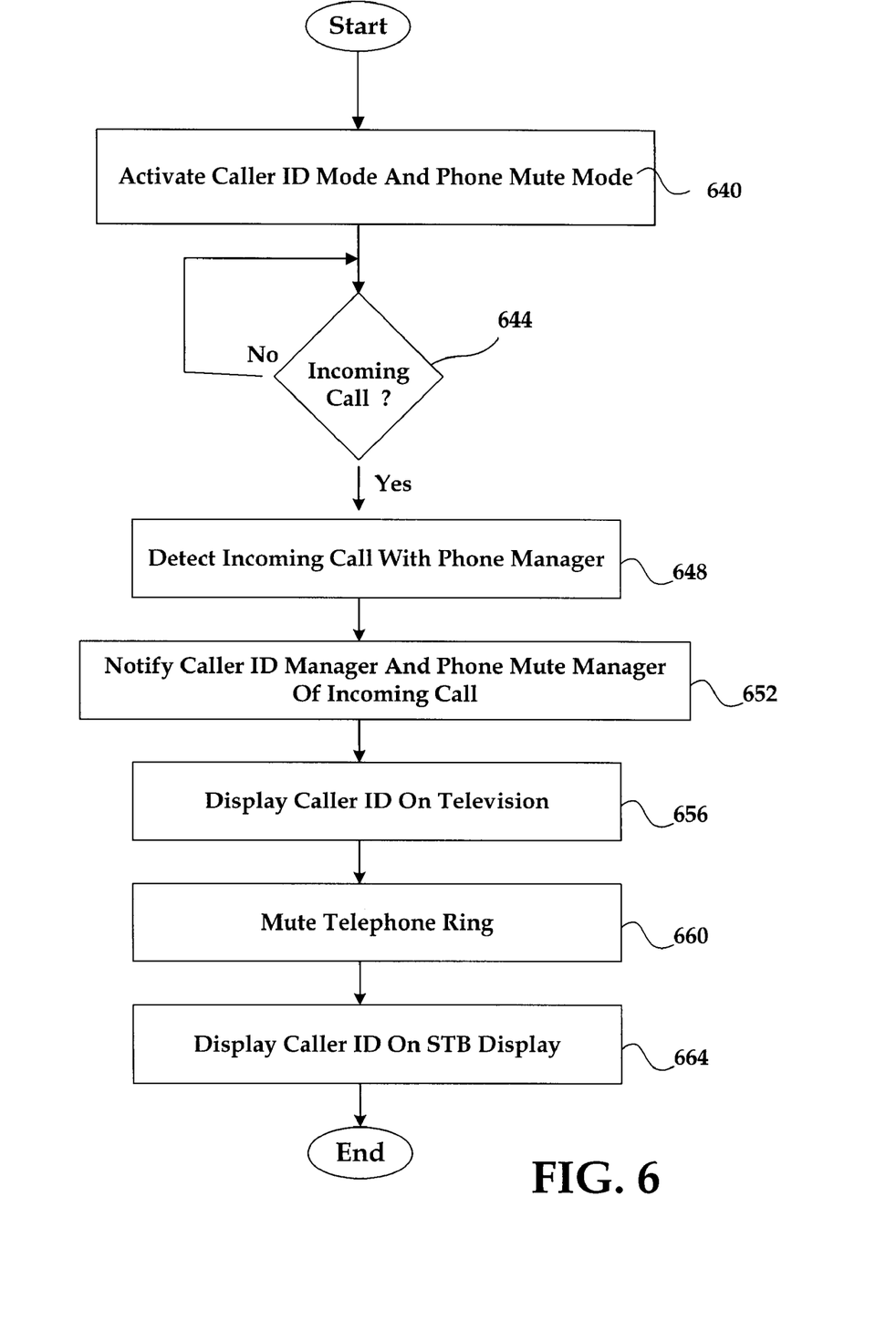
FIG. 6 is a flowchart of method steps for effectively implementing a caller ID mode in conjunction with a phone mute mode, in accordance with one embodiment of the present invention.

Referring now to FIG. 6, a flowchart of method steps for effectively implementing a caller ID mode in conjunction with a phone mute mode is shown, in accordance with one embodiment of the present invention. The FIG. 6 example is presented for purposes of illustration, and in alternate embodiments, the present invention may readily utilize various steps and sequences other than those discussed in conjunction with the FIG. 6 embodiment.

In the FIG. 6 embodiment, in step 640, a system user or other appropriate entity may preferably activate a caller ID mode and a phone mute mode in settop box (STB) 114 (FIG. 1) by utilizing any effective means. For example, the system user may utilize a remote control device 124 to activate the foregoing caller ID mode and phone mute mode. Then, in step 644, STB 114 may preferably monitor a communication line 118 or other suitable input path for an incoming telephone call from an external entity 110.

In step 648, if an incoming telephone call is received by STB 114, then a phone manager 324 may preferably detect the incoming telephone call. Next, in step 652, phone manager 324 may preferably notify a caller ID manager 332 and a phone mute manager 336 that an incoming telephone call has been received by STB 114. In step 656, caller ID manager 332 may preferably display a caller ID or other incoming call icon on a portion of the screen of TV 122 by utilizing any effective technique. For example, caller ID manager 332 may decode caller ID information from the incoming telephone call and send a corresponding caller ID signal to TV 122 whenever the caller ID mode has been activated, and an incoming phone call has been detected.

Then, in step 660, phone mute manager 336 of STB 114 may preferably mute the ringing feature of telephone 128 by utilizing any effective techniques. For example, phone mute manager 336 may send a phone mute signal to telephone 128 whenever the phone mute mode has been activated, and an incoming phone call has been detected. Finally, in step 664, caller ID manager 332 may preferably display the caller ID on STB display 222 of STB 114. The FIG. 6 process may then preferably terminate.

In certain embodiments, the system user may utilize STB 114 as an answering machine device to record and later playback telephone calls which the system user decides not to answer immediately. In accordance with the present invention, the FIG. 6 process thus provides an improved technique for ensuring that telephone sounds do not interrupt television programming that is currently being viewed by a system user. The FIG. 6 process also ensures that sources of incoming telephone calls may be easily screened by a system user who is simultaneously viewing the television programming.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for managing telephonic communications, comprising:

a settop box configured to communicate with a television programming source and a telephone network;

a television coupled to said settop box for displaying television programming from said television programming source;

a telephone coupled to said settop box for receiving telephone calls from said telephone network, said settop box including a TV mute manager for controlling a television mute mode that may be activated to mute audio programming on said television when receiving said telephone calls, said settop box further including a caller ID manager that controls a caller ID mode that may be activated to display caller identifications on said television when receiving said telephone calls, said settop box also including a phone mute manager that controls a telephone mute mode that may be activated to mute telephone ringing when receiving said telephone calls.

2. The system of claim 1 wherein a system user activates said TV mute mode by utilizing an input/output interface of said settop box.

3. The system of claim 2 wherein a phone manager of said settop box detects an incoming call of said telephone calls from said telephone network.

4. The system of claim 3 wherein said phone manager notifies said TV mute manager that said incoming call has been detected.

5. The system of claim 4 wherein said TV mute manager mutes said audio programming on said television after said phone manager notifies said TV mute manager that said incoming call has been detected.

6. The system of claim 5 wherein said TV mute manager generates and transmits an audio mute signal to said television in order to mute said audio programming.

7. The system of claim 5 wherein said phone manager of said settop box instructs said telephone to ring after said audio programming has been muted so that said system user is notified about said incoming call.

8. The system of claim 1 wherein a system user activates said caller ID mode by utilizing an input/output interface of said settop box.

9. The system of claim 8 wherein a phone manager of said settop box detects an incoming call of said telephone calls from said telephone network.

10. The system of claim 9 wherein said phone manager notifies said caller ID manager that said incoming call has been detected.

11. The system of claim 10 wherein said caller ID manager displays an appropriate one of said caller identifications on a portion of a screen of said television after said phone manager notifies said caller ID manager that said incoming call has been detected.

12. The system of claim 11 wherein said caller identification includes at least one of a caller name, a caller telephone number, and an incoming call icon.

13. The system of claim 11 wherein said phone manager of said settop box instructs said telephone to ring after said caller ID has been displayed on said television so that said system user may screen said incoming call.

14. The system of claim 13 wherein said caller ID manager displays said caller identification on a STB display on said settop box after said phone manager of said settop box instructs said telephone to ring.

15. The system of claim 14 wherein said system user may utilize said settop box as a hand-free telephone device to answer said incoming call by utilizing said phone manager, speakers of said television, and a microphone device coupled to said settop box.

16. The system of claim 14 wherein said system utilizes said caller ID mode at the same time as utilizing said TV mute mode.

17. The system of claim 14 wherein said system user activates said phone mute mode when said caller ID mode is activated by utilizing said input/output interface of said settop box.

18. The system of claim 17 wherein said phone manager notifies said phone mute manager that said incoming call has been detected, said phone mute manager responsively muting a telephone ringing function of said telephone so that said audio programming from said television is not interrupted by said incoming call.

19. The system of claim 18 wherein said phone mute manager generates and transmits a ring mute signal to said telephone when said phone manager notifies said phone mute manager that said incoming call has been detected.

20. The system of claim 19 wherein said system user may utilize said settop box as an answering machine to record said incoming call in order to listen to said incoming call at a later time.

21. A method for managing telephonic communications, comprising the steps of:
communicating with a television programming source and a telephone network by utilizing a settop box;
displaying television programming from said television programming source on a television that is coupled to said settop box;
receiving telephone calls from said telephone network with a telephone coupled to said settop box, said settop box including a TV mute manager for controlling a television mute mode that may be activated to mute audio programming on said television when receiving said telephone calls, said settop box further including a caller ID manager that controls a caller ID mode that may be activated to display caller identifications on said television when receiving said telephone calls, said settop box also including a phone mute manager that controls a telephone mute mode that may be activated to mute telephone ringing when receiving said telephone calls.

22. The method of claim 21 wherein a system user activates said TV mute mode by utilizing an input/output interface of said settop box.

23. The method of claim 22 wherein a phone manager of said settop box detects an incoming call of said telephone calls from said telephone network.

24. The method of claim 23 wherein said phone manager notifies said TV mute manager that said incoming call has been detected.

25. The method of claim 24 wherein said TV mute manager mutes said audio programming on said television after said phone manager notifies said TV mute manager that said incoming call has been detected.

26. The method of claim 25 wherein said TV mute manager generates and transmits an audio mute signal to said television in order to mute said audio programming.

27. The method of claim 25 wherein said phone manager of said settop box instructs said telephone to ring after said audio programming has been muted so that said system user is notified about said incoming call.

28. The method of claim 21 wherein a system user activates said caller ID mode by utilizing an input/output interface of said settop box.

29. The method of claim 28 wherein a phone manager of said settop box detects an incoming call of said telephone calls from said telephone network.

30. The method of claim 29 wherein said phone manager notifies said caller ID manager that said incoming call has been detected.

31. The method of claim 30 wherein said caller ID manager displays an appropriate one of said caller identifications on a portion of a screen of said television after said phone manager notifies said caller ID manager that said incoming call has been detected.

32. The method of claim 31 wherein said caller identification includes at least one of a caller name, a caller telephone number, and an incoming call icon.

33. The method of claim 31 wherein said phone manager of said settop box instructs said telephone to ring after said caller ID has been displayed on said television so that said system user may screen said incoming call.

34. The method of claim 33 wherein said caller ID manager displays said caller identification on a STB display on said settop box after said phone manager of said settop box instructs said telephone to ring.

35. The method of claim 34 wherein said system user may utilize said settop box as a hand-free telephone device to answer said incoming call by utilizing said phone manager, speakers of said television, and a microphone device coupled to said settop box.

36. The method of claim 34 wherein said system utilizes said caller ID mode at the same time as utilizing said TV mute mode.

37. The method of claim 34 wherein said system user activates said phone mute mode when said caller ID mode is activated by utilizing said input/output interface of said settop box.

38. The method of claim 37 wherein said phone manager notifies said phone mute manager that said incoming call has been detected, said phone mute manager responsively muting a telephone ringing function of said telephone so that said audio programming from said television is not interrupted by said incoming call.

39. The method of claim 38 wherein said phone mute manager generates and transmits a ring mute signal to said telephone when said phone manager notifies said phone mute manager that said incoming call has been detected.

40. The method of claim 39 wherein said system user may utilize said settop box as an answering machine to record said incoming call in order to listen to said incoming call at a later time.

41. A computer-readable medium comprising program instructions for managing telephonic communications by performing the steps of:
communicating with a television programming source and a telephone network by utilizing a settop box;

displaying television programming from said television programming source on a television that is coupled to said settop box;

receiving telephone calls from said telephone network with a telephone coupled to said settop box, said settop box including a TV mute manager for controlling a television mute mode that may be activated to mute audio programming on said television when receiving said telephone calls, said settop box further including a caller ID manager that controls a caller ID mode that may be activated to display caller identifications on said television when receiving said telephone calls, said settop box also including a phone mute manager that controls a telephone mute mode that may be activated to mute telephone ringing when receiving said telephone calls.

* * * * *